United States Patent [19]

Horiuchi et al.

[11] 4,199,711

[45] Apr. 22, 1980

[54] CONTROL APPARATUS FOR ELECTRIC MOTOR VEHICLES

[75] Inventors: Michimasa Horiuchi, Mito; Masahiko Ibamoto; Jinichi Toyama, both of Katsuta, all of Japan

[73] Assignee: Hitachi, Ltd., Japan

[21] Appl. No.: 897,712

[22] Filed: Apr. 19, 1978

[30] Foreign Application Priority Data

Apr. 22, 1977 [JP] Japan .................................... 52-45787

[51] Int. Cl.$^2$ ............................................. H02P 5/16
[52] U.S. Cl. ...................................... 318/139; 318/341; 318/457; 318/373
[58] Field of Search ............... 318/456, 457, 489, 341, 318/648, 373, 396, 139, 136, 430, 431; 180/105 E

[56] References Cited

U.S. PATENT DOCUMENTS

| | | | |
|---|---|---|---|
| 3,630,304 | 12/1971 | Sahinkaya | 318/308 |
| 3,828,235 | 8/1974 | Price et al. | 318/373 |
| 4,124,088 | 11/1978 | Kuriyama | 180/105 E |

*Primary Examiner*—David Smith, Jr.
*Attorney, Agent, or Firm*—Craig and Antonelli

[57] ABSTRACT

A control apparatus for an electric motor vehicle includes a control system to increase the duty cycle of a chopper circuit driving an electric drive motor of the vehicle when a spontaneous backward movement takes place upon starting of the vehicle at an uphill gradient, thereby to increase the armature and field current of the drive motor and hence the counter current braking effort or so-called plugging effort. The control apparatus assures a reliable starting of the vehicle even at an uphill gradient road.

5 Claims, 6 Drawing Figures

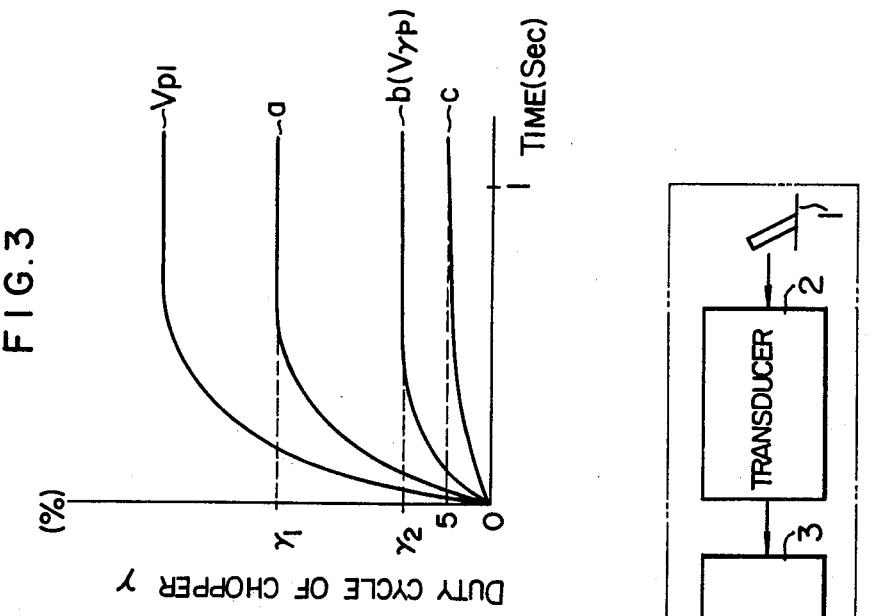
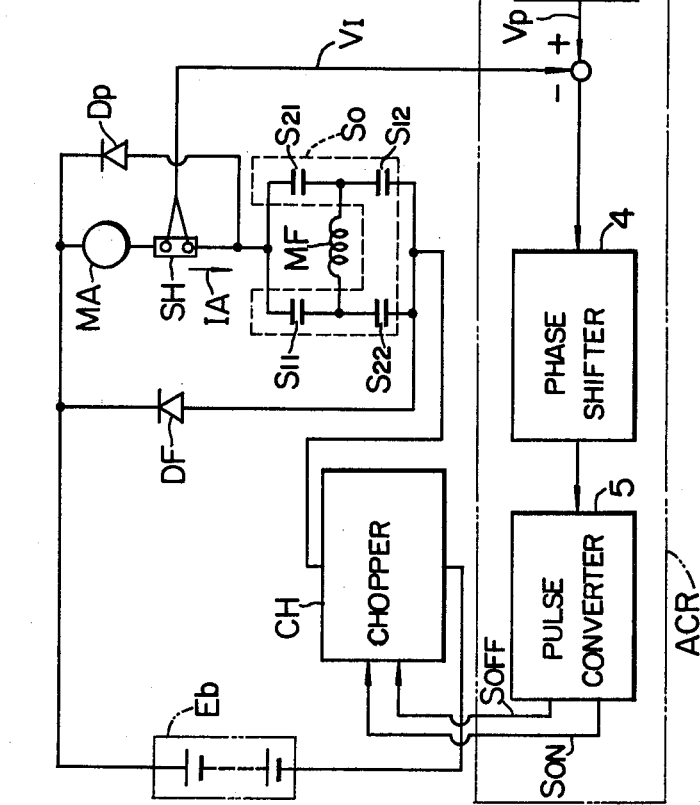
FIG.1
FIG.3

CONTROL APPARATUS FOR ELECTRIC MOTOR VEHICLES

LIST OF THE PRIOR ART REFERENCES [37CFR 1.56(a)]

The following reference is cited to show the state of the art:

U.S. Pat. No. 3,344,328, H. E. Morris, 1967

BACKGROUND OF THE INVENTION

The present invention relates to a control apparatus for electric motor vehicles and in particular to a control apparatus which assures starting of the electric motor vehicle even on an uphill gradient with an improved reliability and safety.

The hitherto known electric motor vehicles incorporating a battery as a power supply source such as a fork lift truck for example may be generally classified into two types, i.e. a first type in which an accelerator pedal and a brake pedal for actuating a hydraulic-mechanical brake system are laterally separately provided with an appropriate distance therebetween so as to be manipulated individually by the feet of an operator as is common in conventional motorcars and a second type in which both of the pedals are disposed at one lateral side so as to by operated by a single foot of the operator. In conventional electric motor vehicles, a counter current braking system or plugging system has been usually utilized. In the case of the first type motor vehicles, a so-called uphill starting (starting of a motor vehicle on the way of an uphill gradient road) can be effected safely and smoothly without giving rise to the danger of spontaneous reverse movement of the vehicle under gravity by virtue of the fact that the brake pedal and the accelerator pedal can be manipulated individually by two feet, as it is common in the conventional motorcars. On the other hand, in the case of the second type motor vehicles, the vehicle will be likely to be moved backward spontaneously upon the uphill starting, because the brake pedal has to be released before the accelerator pedal can be actuated. In the electric motor vehicles having the plugging mechanism, once the spontaneous reverse or backward movement has occured upon the uphill starting, it becomes difficult to suppress such retrogression and restart the vehicle in the forward direction, even if the accelerator pedal is actuated to its full stroke. Because once the spontaneous reverse or backward movement has occured upon the uphill starting, a plugging circuit is formed, but the plugging force is comparatively weak.

Next, referring to FIG. 1, description in detail will be made on a hitherto known control apparatus utilizing a chopper circuit feeding system for a battery fork lift truck provided with a conventional counter current braking system or plugging means which is usually operative in the course of running on a flat surface. Referring to FIG. 1, an armature MA of a drive motor, a current detector SH for detecting the armature current, a switching contactor device $S_0$ and a chopper circuit CH are connected in series to a battery $E_b$. The contactor device $S_0$ is adapted to close contacts $S_{11}$ and $S_{12}$ for a forward movement, while closing contacts $S_{21}$ and $S_{22}$ for a backward drive thereby to reverse the polarity of field current flowing through the field winding MF of the motor. Connected in parallel to the series connection of the armature MA, the current detector SH and the contactor $S_0$ is a plugging diode $D_p$ which is adapted to allow the motor current to flow therethrough upon plugging operation. A fly-wheel diode $D_F$ is connected in parallel to the series connection of the armature MA and the detector SH to conduct therethrough inductive energy of the armature MA and the field winding MF in response to the chopper circuit CH being turned off.

The control in the course of the forward running with the forward contactors $S_{11}$ and $S_{12}$ being closed is effected in the manner described below. The actuated position of the accelerator foot pedal 1 is converted into a corresponding electric quantity through a circuit command signal transducer 2, the output command signal from which is applied to a time delay circuit 3 having a predetermined time constant thereby to obtain an armature current command value $V_P$. In dependence on the difference between the armature current command value $V_P$ and the detected current $V_I$ of the armature current $I_A$, the phase angle of the output signal from a phase shifter 4 having also an amplifying function is controlled and applied to a pulse converter 5 which in turn produces "ON" and "OFF" signals $S_{ON}$ and $S_{OFF}$ to the chopper circuit CH. With such arrangement of the automatic current regulator ACR, the output signals $S_{ON}$ and $S_{OFF}$ of the chopper circuit CH is so controlled that the armature current $I_A$ may follow the current command value $V_P$ given by the actuation of the accelerator foot pedal 1, thereby to allow the forward power running of the vehicle through the constant current control. The control of the drive motor with the aid of a chopper circuit has been widely adopted in the prior art. Of course, the above described circuit arrangement has been hitherto known.

When the contactors $S_{21}$ and $S_{22}$ for the backward drive are closed during the forward power running of the electric motor vehicle, the rotation of the rotor or armature of the electric motor in the forward direction is still maintained at that instant. However, because the polarity of current flowing through the field system MF is inverted through the change-over of the contactor drive $S_0$ as described above, a brake effort due to counter current braking is applied to the rotor. In this connection, it will be appreciated that the counter current braking effort will become greater proportionally as the current flowing through the field system is larger. Under such plugging condition, the polarity of the voltage induced in the motor is opposite to that of the voltage induced during the forward running and is the same as that of the battery voltage $E_b$, whereby impedance of the motor circuit is equivalently reduced. As a consequence, the duty cycle of the chopper circuit CH is decreased to a small value (less than about 5%), because the armature current $I_A$ is caused to follow the current command value $V_P$.

When the rotation of the drive motor in the forward running direction is stopped due to the plugging then the electric motor vehicle can start the backward running through the constant current control, provided that the contactors $S_{21}$ and $S_{22}$ for the backward running are maintained in the closed position.

It should be mentioned that the armature current command value $V_P$ corresponding to the magnitude of actuation of the accelerator foot pedal is so set that there can be produced the actual armature current $I_A$ which assures desired running performances of the vehicle in both the forward and the backward directions. The circuit shown in FIG. 1 is so arranged that the constant current control is performed in which the armature current $I_A$ is caused to be equal to or to follow the current command value $V_P$ even at the time of the plugging condition. In other words, the plugging is effected on the basis of the current command value $V_P$ which conform to the running performances of the vehicle in the forward and the backward directions. As a consequence, the plugging performance is determined definitely in dependence on the specification of the electric motor and impedance of the motor circuit as employed for a given value of the current command signal $V_P$. Alternatively, it was impossible to attain an increased braking effort by correspondingly increasing the field current only at the plugging time.

Now, it is assumed that a battery motorcar such as fork lift truck is going to start on an uphill gradient road. When the accelerator pedal 1 is actuated after the vehicle has undergone the spontaneous retrogression thereby to produce the armature current $I_A$ in accordance with the current command value $V_P$, plugging will occur in the electric motor because of the rotation of the rotor or armature in the backward or reverse direction. It is possible to start the vehicle even at the uphill gradient if the reverse rotation of the drive motor can be stopped through the plugging. However, it should be noted that such plugging performance is generally so selected as to be suited for the running on a flat road, as a result of which there after arises the case wherein the uphill starting of vehicle is rendered impossible in dependence on the gradient of the uphill road and the load on the electric motor vehicle because the available plugging turque is insufficient for preventing or stopping the spontaneous backward movement of the vehicle.

SUMMARY OF THE INVENTION

An object of the invention is to provide a control apparatus for electric motor cars which allows the starting thereof even on an uphill gradient (uphill starting) with high reliability and safety.

According to a feature of the invention, a duty cycle control circuit is provided which controls the duty cycle of a chopper circuit for feeding a DC motor of an electric motor vehicle through a feedback loop in such a manner that the duty cycle control circuit produces an output only at the plugging upon the uphill starting thereby to set an increased value for the duty cycle of the chopper circuit for assuring the positive starting of the vehicle even on an uphill gradient.

BRIEF DESCRIPTION OF THE DRAWINGS

FIG. 1 is a block diagram illustrating a hitherto known control apparatus for electric motor vehicles in which a battery is used as a drive power supply source and driving operation as well as counter current braking are effected through a chopper circuit.

FIGS. 3, 4A, 4B and 4C are graphical representations to illustrate operations of the control apparatus shown in FIG. 2, wherein FIGS. 4A, 4B and 4C graphically show the armature current, duty cycle of the chopper circuit and the number revolutions of the armature of the drive motor, respectively.

DETAILED DESCRIPTION OF THE PREFERRED EMBODIMENTS

Figure 2:
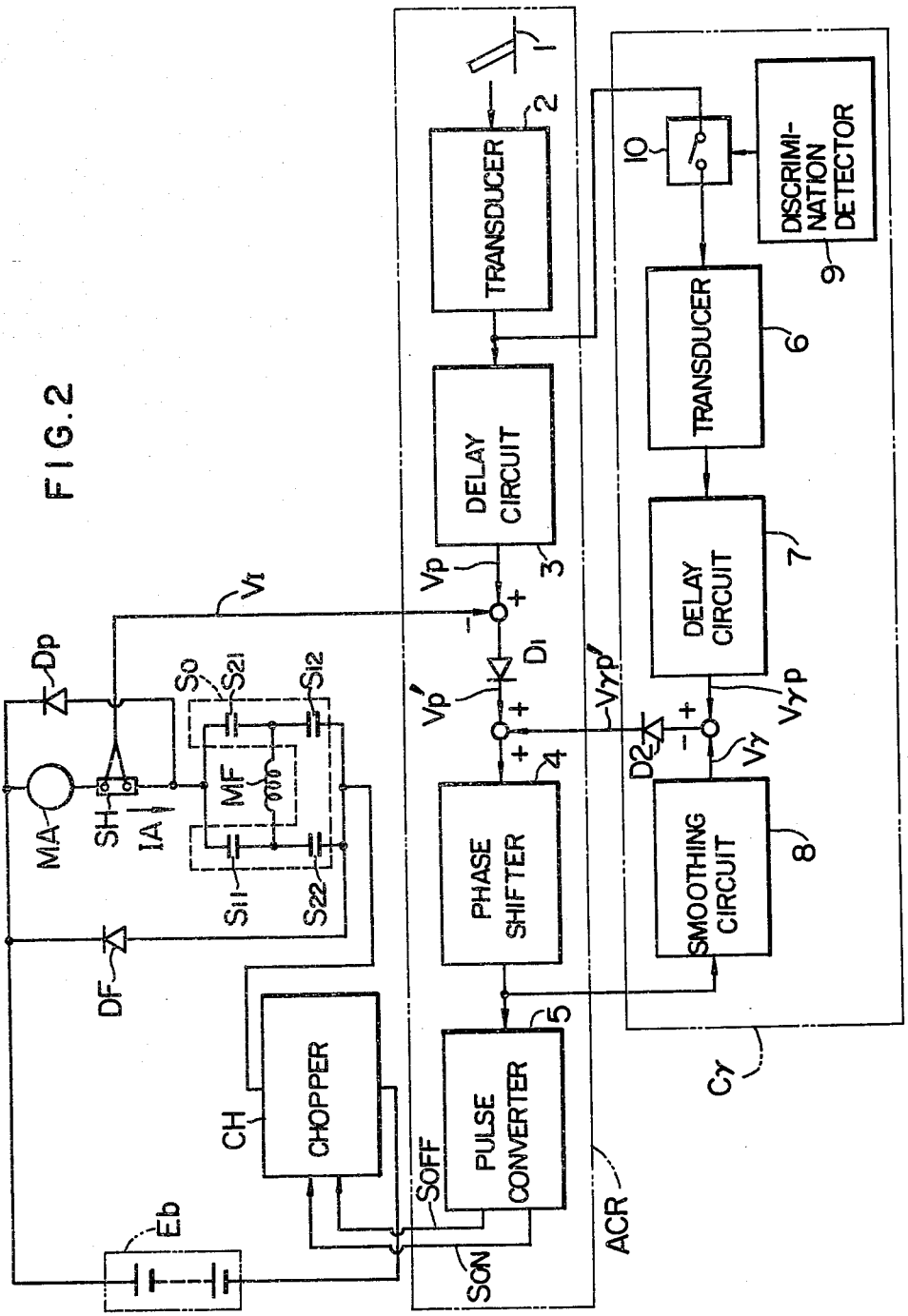
FIG. 2 is a block diagram showing a general arrangement of a control apparatus according to an embodiment of the invention.

In FIG. 2 showing an exemplary embodiment of the invention, components and parts similar or equivalent to those shown in FIG. 1 are indicated by like reference symbols.

Referring to FIG. 2, the mechanical quantity representative of the actuation of the accelerator pedal 1 is converted into a current command value through a transducer 2, which is then applied to a time delay circuit 3 having a predetermined time constant, whereby an armature current command value $V_P$ is obtained. The primary time delay as imparted by the delay circuit 3 is effective for preventing a shock which may be produced and injure loads or goods carried by the fork lift truck, when the accelerator pedal is pressed down abruptly. A diode $D_1$ is provided which is so connected as to produce no output when the sign of difference $(V_P-V_I)$ between the current command value $V_P$ and the detected value $V_I$ of the armature current $I_A$ is negative. The output signal $V_P'$ from the diode $D_1$ is added with an output signal $V_{\gamma p}'$ from a duty cycle control circuit $C_\gamma$ described hereinafter in detail thereby to produce a sum signal which is then utilized to control the phase angle of output from a phase shifter 4. The phase-controlled output signal from the phase shifter 4 is applied to a pulse converter 5 thereby to produce "ON" and "OFF" signals $S_{ON}$ and $S_{OFF}$ for the chopper circuit CH.

The duty cycle control circuit $C_\gamma$ is composed of a duty cycle command signal transducer 6 applied with the output from the current command transducer 2 through a switch 10 described hereinafter, and a time delay circuit 7 for delaying the duty cycle command signal from the transducer 6 with a predetermined time constant. From the output of the time delay circuit 7, a duty cycle command value $V_{\gamma p}$ is produced. Since the pulse width of the output signal from the phase shifter 4 is substantially equal to the conducting duration of the chopper circuit CH, the output $V_\gamma$ from a filter or smoothing circuit 8 to which the output signal from the phase shifter 4 is applied is a DC voltage of a magnitude proportional to the duty cycle of the chopper circuit CH. A difference signal between the duty cycle command value $V_p$ and the output $V_\gamma$ from the filter or smoothing circuit 8 constitutes the output signal $V_{\gamma p}'$ of the duty cycle control circuit $C_\gamma$ through a diode $D_2$, as described hereinbefore. It is to be noted that the output $V_{\gamma p}'$ from the duty cycle control circuit $C_\gamma$ is zero due to the blocking action of the diode when the sign of difference $(V_{\gamma p}-V_\gamma)$ is negative, i.e. the output $V_\gamma$ from the smoothing circuit 8 is higher than the duty cycle command value $V_{\gamma p}$.

Referring to FIG. 3, it can be seen that the duty cycle of the chopper CH will increase as indicated by a curve a to be finally saturated at $\gamma_1$ at a maximum load on the electric motor (e.g. when the rotation of the armature is locked). The duty cycle $\gamma_1$ is given by $\gamma_1 = I_{A1} \cdot R_o / E_b$, where $I_{A1}$ represents armature current and $R_o$ is impedance of the motor circuit. The counter electromotive force $V_M$ is neglected on the assumption that the armature is in the locked state. The rise time required for the curve a to attain the value $\gamma_1$ is determined by the time constant of the current command delay circuit 3 and is proportional to the rise time of the current command value $V_{p1}$.

On the other hand, when the motor load is smaller than the maximum load described above as in the case of the usual power running, voltage $V_M$ induced in the motor is generated with the polarity opposite to that of the battery voltage $E_b$, the duty cycle $\gamma$ of the chopper circuit is given by $I_{A1} \cdot R_o / E_b - V_M$, which is apparently greater than the duty cycle characteristic a at the maximum motor load. Although the final value $\gamma_1$ of the duty cycle of the chopper circuit at the maximum motor load can be changed by varying the current command value $V_P$, the value $\gamma$ of the duty cycle in the usual power running mode will never become lower than the value $\gamma_1$ appearing at the maximum motor load.

It should be mentioned that the duty cycle command value transducer 6 as well as the duty cycle command delay circuit 7 are so arranged that the duty cycle command value $V_{\gamma p}$ will be always smaller than the duty cycle $\gamma_1$ at the time of the maximum motor load. The curve b in FIG. 3 shows variation in the duty cycle as a function of the duty cycle command value $V_{\gamma p}$. With the duty cycle command value $V_{\gamma p}$ being set as described above, the duty cycle of the chopper circuit remains always greater than the duty cycle command value $V_{\gamma p}$ in the power running mode either in the forward or the backward direction. Accordingly, the output from the smoothing circuit 8 is greater than $V_{\gamma p}$, the difference $(V_{\gamma p} - V_{\gamma})$ is of negative sign, whereby the output $V_{\gamma p}$, from the duty cycle control circuit $C_\gamma$ becomes zero. It should be noted that the difference signal may constitute the output $V_{\gamma p}$, through the diode $D_2$ only when the difference $(V_{\gamma p} - V_{\gamma})$ is positive. In this manner, the constant current control in which the armature current $I_A$ is caused to follow the current command value $V_p$ is effected through the current regulator system ACR in the power running mode of the motor vehicle either in the forward or backward direction due to the fact that no output signal is produced from the duty cycle control circuit $C_\gamma$ in such power running mode, as described above.

Referring again to FIG. 2, the duty cycle control circuit $C_\gamma$ includes a detector 9 for discriminating the power running in the forward and the backward directions and the plugging condition (counter current braking operation) on a flat road from each other. The expression "the plugging condition or operation on a flat road" designates the fact that an electric motor vehicle running on a flat road in the forward (or backward) direction can be stopped by changing-over operation of the contactor device 8 to the backward (or the forward) direction. Such change-over through the contactor device $S_0$ brings about a large braking in the motor thereby to stop the motor rapidly. For such detector 9, a mercury switch which is actuated by an inclination thereof may be employed which can detect the gradient of the uphill road to perform the imposed operation. Reference numeral 10 denotes a switch controlled by the detector 9 and adapted to be closed in the forward or backward power running mode and opened upon the plugging operation. In this way, since the switch 10 is opened when the plugging operation on a flat road is carried out by changing-over the contactor device $S_0$ in the forward or backward power running mode, the duty cycle control circuit $C_\gamma$ will never be operated. In this sense, the duty control circuit $C_\gamma$ would be unnecessary so far as the vehicle should be driven in this mode only.

On the contrary, when the electric motor vehicle is about to start on an uphill gradient, the switch 10 is closed to set the duty cycle control circuit $C_\gamma$ in the operative state. Consequently, when an electric motor vehicle such as a fork lift truck is going to start on an uphill gradient and undergoes the spontaneous backward movement, the plugging brake is applied to the armature of the motor. Because the motor circuit is equivalently in a low-impedance state under these conditions, the duty cycle of the chopper circuit CH for the armature current $I_A$ corresponding to the current command value $V_p$ will be far lower than the duty cycle $\gamma_1$ (curve a in FIG. 3) at the maximum motor load. In this connection, it should be recalled that the duty cycle command value $V_{\gamma p}$ (characteristic curve b in FIG. 3) of the duty cycle control circuit $C_\gamma$ is so selected as to be greater than the duty cycle of the chopper CH at the plugging operation of a hitherto known control apparatus such as shown in FIG. 1 having no duty cycle control circuit $C_\gamma$ (characteristic curve C in FIG. 3). Consequently, under such uphill starting condition, the difference between the duty cycle command value $V_{\gamma p}$ and the detected duty cycle $V_\gamma$ of the chopper circuit CH at the plugging will take positive sign or polarity, as the result of which the duty cycle control circuit $C_\gamma$ produces the output $V_{\gamma p}'$ thereby to increase the duty cycle of the chopper for about 30% to 35%, whereby the armature current $I_A$ is increased beyond the current command value $V_p$. When the armature current $I_A$ has exceeded the current command value $V_p$, the difference signal between these current signals is blocked by the diode $D_1$ to cause $V_p'$ to be zero. Under the circumstances, the duty cycle of the chopper CH will then follow the duty cycle control command $V_{\gamma p}$ rather than the current command value $V_p$.

In other words, in the plugging mode for an uphill starting of the electric motor vehicle, the duty cycle of the chopper circuit CH is increased independently from the current command value $V_p$, thereby to increase the armature current $I_A$ beyond the current command value $V_p$ and hence increase correspondingly also the field current flowing through the field system MF, resulting in the increased plugging brake effort. In this manner, dangerous spontaneous backward movement of the vehicle which is about to start at an uphill gradient can be positively prevented.

Further, since the duty cycle command value $V_{\gamma p}$ is varied as a function of magnitude of actuation of the accelerator pedal, it is possible to obtain continuously an optimum plugging brake effort in which the magnitude of actuation of the accelerator pedal is taken into consideration.

The reason why the duty cycle control circuit $C_\gamma$ is prevented from operation at the plugging operation during the power running on a flat road can be explained by the fact that a great braking effort applied to a vehicle such as the fork lift truck in such flat running mode might involve a shock to the vehicle, giving rise to the danger that goods transported by the vehicle might be subjected to destruction, injury or other damage under the shock. In other words, the control apparatus according to the invention allows a smooth control as well as proper plugging brake operation of the electric motor vehicle during the power running on a flat road in either direction on one hand, and can assure positively the prevention of the backward movement of the vehicle due to possible spontaneous retrogression at the uphill starting on the other hand.

Figure 4A:
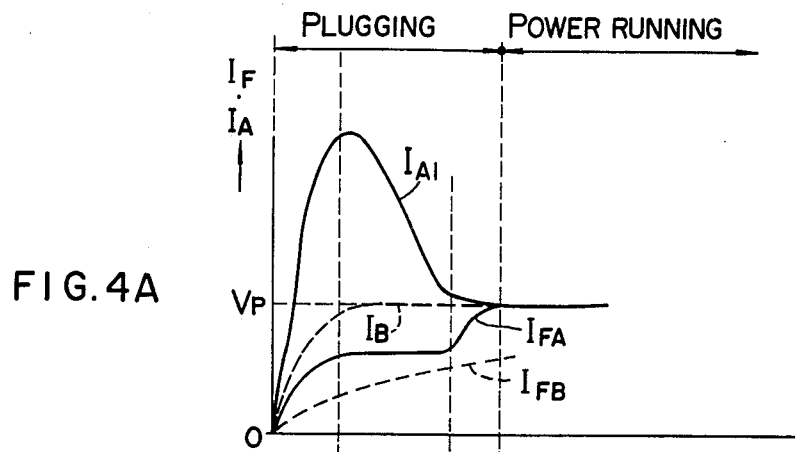
Figure 4B:
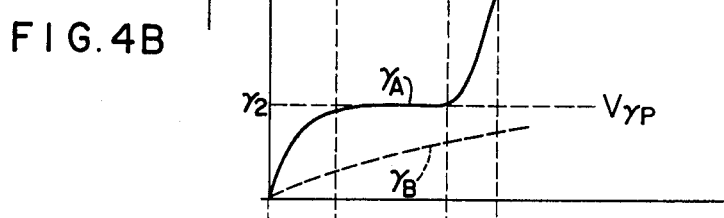
Figure 4C:
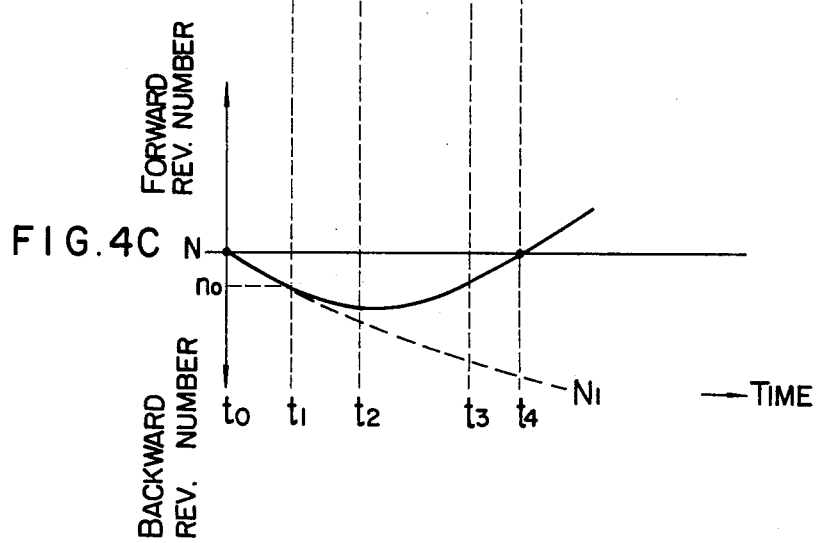

Now, the operation of the control apparatus according to the invention will be described as compared with the hitherto known control apparatus by referring to FIGS. 4A, 4B and 4C which show characteristic graphs of the armature current $I_A$, the field current $I_F$, the duty cycle $\gamma$ of the chopper circuit and the revolution number N of the armature, respectively. In these figures, it is assumed that the power running takes place after the time point $t_4$, while the plugging operation is effected during a time span $t_1$ to $t_4$. Assuming now that the brake pedal of a hydro-mechanical braking system is released on an uphill gradient road and the vehicle is spontaneously moved backwardly under gravity with the rotation number in the reverse or backward direction being progressively increased, the rotation number characteristic of the motor controlled by the hitherto known control apparatus will vary in such a manner as indicated by a broken line $N_1$. In contrast thereto, in the case of the control apparatus according to the invention, the plugging operation is initiated at the time point $t_1$ at the reverse or backward revolution number $n_o$ after the backward movement of the vehicle during a time span of $t_0$ to $t_1$. During the time span of $t_1$ to $t_4$, the duty cycle control circuit $C_\gamma$ produces the output signal $V_{\gamma p}$, and the ducy cycle $\gamma_A$ of the chopper circuit is controlled on the basis of teh duty cycle command value $V_{\gamma p}$. It will be seen from FIG. 4B that the duty cycle $\gamma_A$ of the chopper circuit CH of the inventive control apparatus is increased significantly as compared with the chopper duty cycle $\gamma_B$ of the hitherto known control apparatus as indicated by broken line. Correspondingly, the armature current $I_{A1}$ is also increased over the current $I_B$ attained in the prior art control circuit, as shown in FIG. 4A. Similarly, the field current $I_{FA}$ is also increased over the current $I_{FB}$ attained in the prior art control circuit, as shown in FIG. 4A. The increased armature current will of course involve a correspondingly increased plugging brake effort, which results in a decreased number of revolutions N of the armature. Referring to FIG. 4c, impedance of the armature circuit is equivalently increased during the time span of $t_2$ to $t_3$ with the armature current $I_{A1}$ being progressively reduced because the duty cycle $\gamma$ is saturated at $\gamma_2$ (FIG. 4B). When the backward or reverse rotation number of the armature is decreased to a value corresponding to the time point $t_3$ and the armature current $I_{A1}$ which has attained the current command value $V_p$ tends to be further decreased, then the difference between the current command value $V_p$ and the detected value $V_p$ of the armature current will take the positive sign, whereby the output signal $V_{p'}$ is produced. Since the armature current $I_{A1}$ is caused to follow the current command value $V_p$, the duty cycle $\gamma$ of the chopper CH becomes greater than the duty cycle command value $V_{\gamma p}$ (refer to FIG. 4B, time interval between $t_3$ and $t_4$). Thus, the output $V_{\gamma p'}$ from the duty cycle control circuit $C_\gamma$ becomes zero at the time point $t_3$.

The duty cycle $\gamma_A$ of the chopper CH at $t_4$ corresponds to the duty cycle $\gamma_1$ at the maximum motor load. Since the power running takes place after the time point $t_4$, the armature current $I_{A1}$ is again caused to follow the current command value $V_p$ under the constant current control.

As will be appreciated from the above description, according to the teachings of the invention, the duty cycle of the chopper is increased during the time interval between $t_1$ and $t_4$ over the duty cycle of the chopper of the hitherto known control apparatus, whereby the armature current $I_A$ is increased correspondingly. Because the plugging brake effort is substantially proportional to the product of the armature current $I_A$ and the field current $I_{FA}$, the brake effort is significantly enhanced during the time span of $t_1$ to $t_4$, whereby the backward or reverse rotation of the drive motor can be positively prevented to allow the uphill starting of the vehicle.

In the description of the embodiment shown in FIG. 2, it has been assumed that the input signal to the duty cycle control circuit $C_\gamma$ is derived from the magnitude of actuation of the accelerator pedal. However, it will be appreciated that the invention may be implemented in such a manner that an input signal of a constant level is applied to the duty cycle command transducer 6 through the switch 10.

We claim:

1. A control apparatus for electric motor vehicles including a DC power supply source, a series connection of an electric motor and a chopper circuit, a first diode connected in parallel to said electric motor, a second diode connected in parallel to the armature of said electric motor, switching means for changing-over the polarity of field current of said electric motor upon counter current braking, and a first control system including a phase shifter for controlling the duty cycle of said chopper circuit so as to cause the current flowing through said armature to follow an armature current command value, wherein said control apparatus further includes a second control system for increasing the duty cycle of said chopper circuit when a spontaneous backward movement of said electric motor vehicle takes place upon the starting thereof at an uphill gradient.

2. A control apparatus according to claim 1, wherein said second control system is adapted to perform arithmetical comparison between a duty cycle command value derived from actuation of an accelerator pedal of said vehicle and a value which is proportional to the duty cycle of said chopper circuit and to produce an output signal when a difference signal is of positive sign, said output signal being inputted to said phase shifter.

3. A control apparatus according to claim 1, wherein, in the power running mode of said electric motor vehicle, the duty cycle of said chopper circuit determined by said second control system is smaller than the duty cycle of said chopper circuit determined by said first control system, whereby a constant current control of said electric motor is effected with said armature current being caused to follow said current command value.

4. A control apparatus according to claim 1, wherein said duty cycle of said chopper circuit is controlled with reference to said duty cycle command value under a constant duty cycle control upon starting of said electric motor vehicle at an uphill gradient by virtue of the fact that said armature current becomes greater than the current command value.

5. A control apparatus according to claim 1, wherein said second control system includes a detector means for automatically discriminating the plugging operation on a flat road and forward/backward power running of said motor vehicle, and a switch adapted to respond to the output from said detector means.

* * * * *